US010223766B2

(12) United States Patent
Dolzhenko et al.

(10) Patent No.: US 10,223,766 B2
(45) Date of Patent: Mar. 5, 2019

(54) IMAGE PROCESSING INCLUDING GEOMETRIC DISTORTION ADJUSTMENT

(71) Applicant: Apical Ltd, Loughborough (GB)

(72) Inventors: Vladimir Dolzhenko, Loughborough (GB); Alex Kornienko, Loughborough (GB); Metin Gokhan Ünal, Gamston (GB); Lloyd Allen, Loughborough (GB)

(73) Assignee: Apical Ltd., Cambridge (GB)

( * ) Notice: Subject to any disclaimer, the term of this patent is extended or adjusted under 35 U.S.C. 154(b) by 1 day.

(21) Appl. No.: 15/475,926

(22) Filed: Mar. 31, 2017

(65) Prior Publication Data

US 2018/0286012 A1 Oct. 4, 2018

(51) Int. Cl.
*G06T 3/00* (2006.01)
*G06T 5/00* (2006.01)
*G06T 7/11* (2017.01)

(52) U.S. Cl.
CPC .......... *G06T 3/0018* (2013.01); *G06T 3/0056* (2013.01); *G06T 7/11* (2017.01); *G06T 5/006* (2013.01); *G06T 2207/10016* (2013.01); *G06T 2207/20021* (2013.01)

(58) Field of Classification Search
CPC ....... G06T 3/0018; G06T 7/11; G06T 3/0056; G06T 2207/10016; G06T 2207/20021; G06T 5/006
See application file for complete search history.

(56) References Cited

U.S. PATENT DOCUMENTS

| | | | | |
|---|---|---|---|---|
| 9,538,077 | B1* | 1/2017 | Huang | H04N 5/23238 |
| 2009/0087115 | A1* | 4/2009 | Wong | G06T 3/0018 |
| | | | | 382/255 |
| 2010/0002071 | A1* | 1/2010 | Ahiska | H04N 5/217 |
| | | | | 348/36 |
| 2015/0262344 | A1 | 9/2015 | Stec et al. | |
| 2015/0298822 | A1* | 10/2015 | Eline | B64C 39/024 |
| | | | | 244/75.1 |

FOREIGN PATENT DOCUMENTS

| | | |
|---|---|---|
| EP | 0676890 A2 | 3/1995 |
| EP | 2362345 A2 | 2/2011 |

OTHER PUBLICATIONS

GB Combined Search and Examination Report dated Aug. 30, 2017 for GB Application No. GB1705267.1.

* cited by examiner

*Primary Examiner* — Jon Chang
(74) *Attorney, Agent, or Firm* — EIP US LLP (57) ABSTRACT

A method including receiving input data representing an input frame of a video. Transformation data representing at least one transformation for applying to an image to adjust a geometric distortion of the image is received. A first and second plurality of input tiles, each including a respective portion of the input frame, is processed with at least part of the transformation data, thereby generating first and second sub-window data representing a first and second sub-window of an output frame of the video, respectively.

20 Claims, 8 Drawing Sheets

IMAGE PROCESSING INCLUDING GEOMETRIC DISTORTION ADJUSTMENT

TECHNICAL FIELD

The present disclosure relates to methods and systems for processing image data, for example data representing an input frame of a video.

BACKGROUND

Certain lenses can be used to capture images or videos with a wide field or angle of view. For example, a fisheye lens is a wide-angle lens that can be used to capture wide panoramic or hemispherical images. Such lenses typically produce a distorted image, with certain parts of the image stretched or compressed compared with other parts. This generally leads to straight image features, such as straight lines, appearing curved rather than straight.

It is known to correct the distortion in an image captured by a fisheye lens to remove or reduce curvature of straight image features.

It is desirable to provide methods and systems for processing image data, for example to adjust a geometric distortion of an image represented by the image data, that are more flexible than known methods and systems.

BRIEF DESCRIPTION OF THE DRAWINGS

Further features will become apparent from the following description, given by way of example only, which is made with reference to the accompanying drawings.

DETAILED DESCRIPTION

Details of the method and systems according to examples will become apparent from the following description, with reference to the figures. In this description, for the purpose of explanation, numerous specific details of certain examples are set forth. Reference in the specification to "an example" or similar language means that a particular feature, structure, or characteristic described in connection with the example is included in at least that one example, but not necessarily in other examples. It should further be noted that certain examples are described schematically with certain features omitted and/or necessarily simplified for ease of explanation and understanding of the concepts underlying the examples.

Examples described herein provide a method including receiving input data representing an input frame of a video. Transformation data representing at least one transformation for applying to an image to adjust a geometric distortion of the image is received. A first plurality of input tiles, each including a respective portion of the input frame, is processed with at least part of the transformation data, thereby generating first sub-window data representing a first sub-window of an output frame of the video. A second plurality of input tiles, each including a respective portion of the input frame, is processed with at least part of the transformation data, thereby generating second sub-window data representing a second sub-window of the output frame of the video. The first and second sub-windows therefore each include a respective transformed portion of the input frame in examples. The transformation for example allows a geometric distortion to be corrected. Thus, the input frame can be captured using a video camera with a wide field of view, which may suffer from geometric distortion. Despite this, and due to the application of the method, the first and second sub-windows may be corrected for this distortion, allowing the output frame to display a wide angle view without suffering from visible artefacts.

The first plurality of input tiles and the second plurality of input tiles may be the same as each other or different from each other. Similarly, the transformation applied to the first plurality of input tiles may be different from or the same as the transformation applied to the second plurality of input tiles. Accordingly, the method in examples described herein is flexible and allows various different combinations of image portions to be transformed in various different ways and displayed in first and second sub-windows, based on the generated first and second sub-window data. This for example allows a wide angle scene to be captured using one video camera and different parts of the scene to be displayed in the first and second sub-windows, respectively, with reduced geometric distortion than in the input frame. For example, the first and second sub-windows can be displayed side-by-side, so that a viewer can observe different physical locations at the same time. This can have applications in security, for example, where it may be desirable to capture security footage over a wide angle scene and to observe movement of individuals throughout the scene. Examples of possible types of transformations that may be applied are described further below, to put the method into context.

Figure 1A:
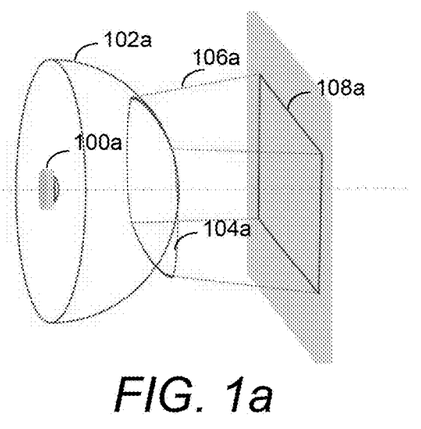
FIGS. 1a, 1b and 1c illustrate an example of a panoramic transformation.
Figure 1B:
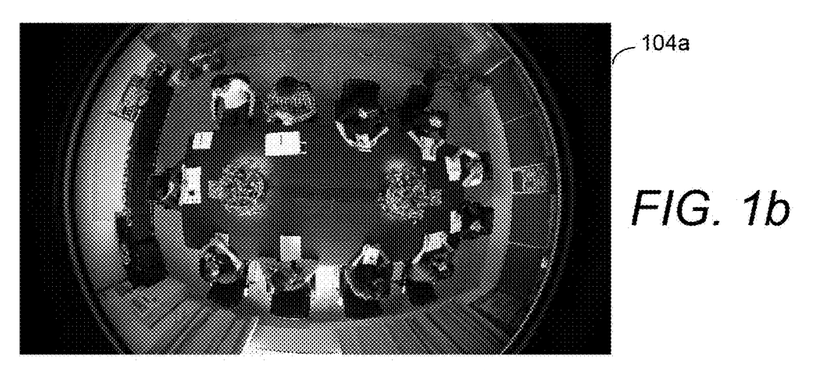
Figure 1C:
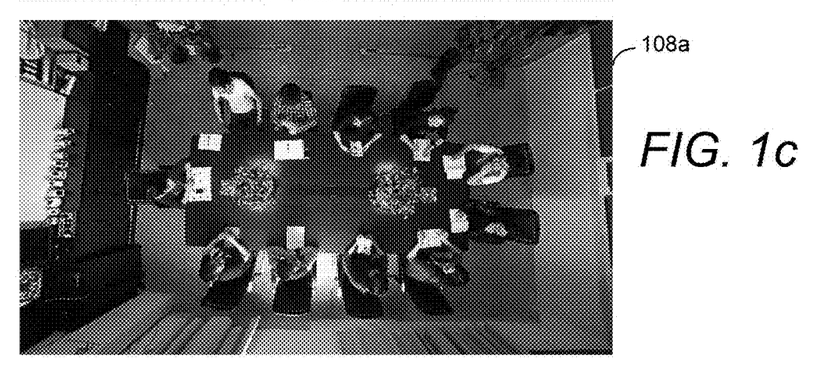

FIGS. 1a, 1b and 1c illustrate an example of a panoramic transformation. The panoramic transformation is shown schematically in FIG. 1a. FIG. 1a illustrates an image capture device 100a, such as a camera or a video camera. In FIG. 1a, the image capture device 100a is a dome camera, which can be mounted for example on a ceiling of a room. The image capture device 100a has a fisheye lens that can capture an image over a field of view 102a that covers a large angle. In this case, the image 104a actually captured by the image capture device 100a corresponds to a central portion of the field of view 102a rather than the entirety of the field of view 102a, although in other examples the image captured by the image capture device may correspond with the entire or whole field of view. The captured image 104a in this example is transformed 106a using a panoramic transformation so that the transformed image 108a appears rectilinear in the vertical and horizontal directions. With this transformation, a wide view angle image can be displayed with reduced artefacts.

An example of the application of a panoramic transformation applied to an image is shown in FIGS. 1b and 1c. FIG. 1b shows the image 104a as captured using a fisheye lens. As can be seen from FIG. 1b, the left and right edges of the image appear curved with respect to the centre of the image. FIG. 1c shows the same image after transformation using a panoramic transformation. In FIG. 1c, the left and right edges of the image no longer appear curved.

Figure 2A:
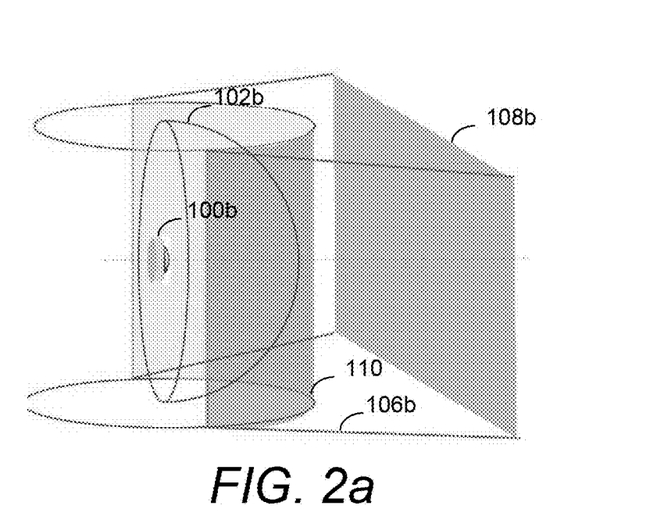
FIGS. 2a, 2b and 2c illustrate an example of a cylindrical transformation.
Figure 2B:
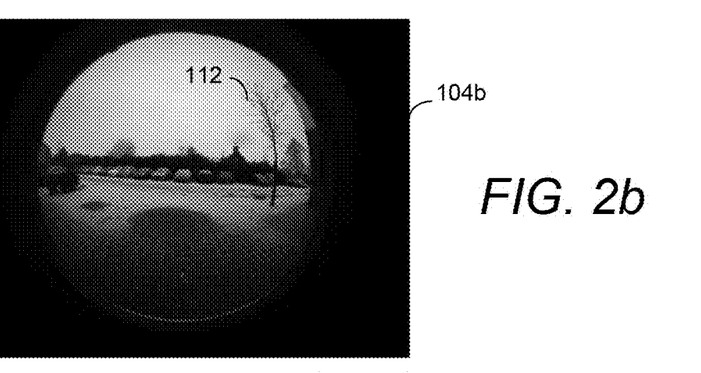
Figure 2C:
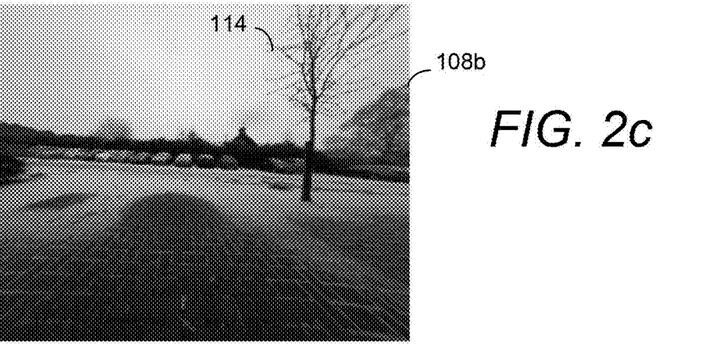

FIGS. 2a, 2b and 2c illustrate an example of a different type of transformation: a cylindrical transformation. Features of FIGS. 2a, 2b and 2c that are similar to corresponding features of FIGS. 1a, 1b and 1c are labelled with the same reference numeral but with a suffix of "b" rather than "a"; corresponding descriptions are to be taken to apply.

In FIG. 2a, an image capture device 100b can also capture an image over a wide field of view 102b. In FIG. 2a, the captured image 104b corresponds with the entire field of view 102b, which in this example is 180 degrees, rather than a subset of the field of view 102c as in FIG. 1a.

However, in this case, a cylindrical transformation is applied. A cylindrical transformation typically allows a spherical image to be mapped to a cylindrical plane (labelled with the reference numeral 110 in FIG. 2a) and then flattened to a two dimensional plane. This allows a full view angle image to be provided. However, there may be some artefacts towards the outer edges of the transformed image 108b. This can be seen by comparing FIGS. 2b and 2c. In particular, the tree 112 on the right edge of FIG. 2b appears to curve around the centre of the captured image 104b of FIG. 2b. After transformation, the same tree 114 in FIG. 2c no longer appears to curve around the centre of the transformed image 108b. However, the rightmost branches of the tree 114 appear to be extended compared with those on the left side of the tree. This is an artefact of the cylindrical transformation, which provides a more accurate transformation, with fewer visible artefacts, in a central region than an outer image region.

Figure 3A:
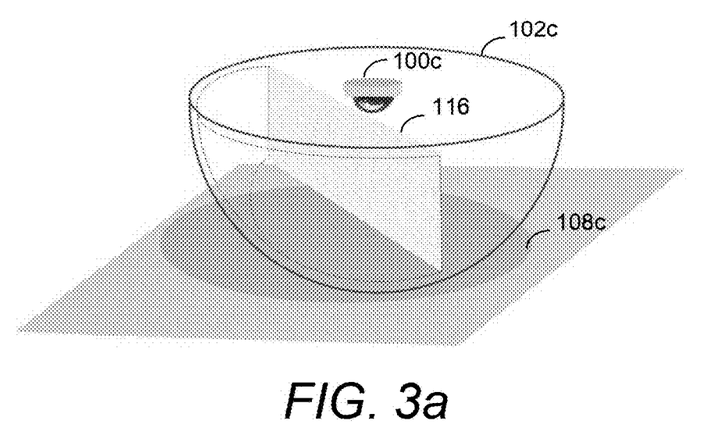
FIGS. 3a, 3b and 3c illustrate an example of a stereographic transformation.
Figure 3B:
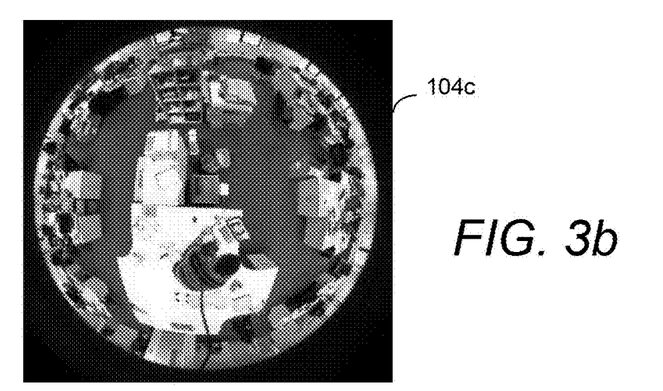
Figure 3C:
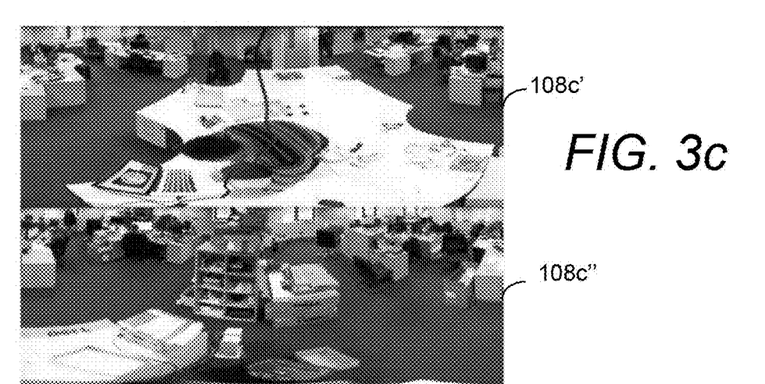

FIGS. 3a, 3b and 3c illustrate an example of a further different type of transformation: a stereographic transformation. Features of FIGS. 3a, 3b and 3c that are similar to corresponding features of FIGS. 1a, 1b and 1c are labelled with the same reference numeral but with a suffix of "c" rather than "a"; corresponding descriptions are to be taken to apply.

In FIGS. 3a, 3b and 3c, the image capture device 100c is a dome camera with a fisheye lens. As in FIGS. 1a, 1b and 1c, the image capture device 100c can for example be mounted on a ceiling of a room to obtain an image of the room taken from above. The image capture device 100c captures an image 104c over a field of view 102 of 180 degrees. In this example, the captured image 104c is divided in two along a dividing line 116. Each half of the image is transformed using a stereographic projection to a flat plane to generate two transformed images 108c', 108c" (as shown in FIG. 3c), with the upper transformed image 108c' corresponding to the upper half of the captured image 104c shown in FIG. 3b and the lower transformed image 108b" corresponding to the lower half of the captured image 104c of FIG. 3b. In this way, the stereographic transformation illustrated in FIGS. 3a, 3b and 3c can create a panoramic view of the scene obtained by the image capture device 100c by producing two separate images. This therefore allows a single camera to be used to capture the scene, instead of a pair of opposed cameras.

Figure 4:
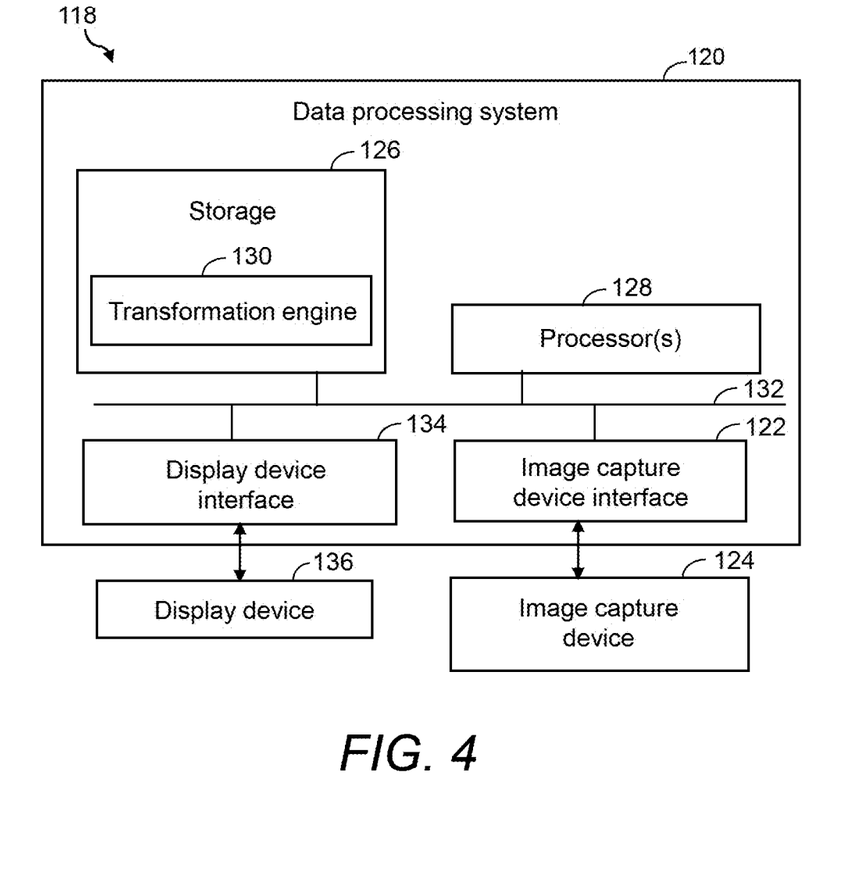
FIG. 4 is a schematic diagram showing an example of internal components of a data processing system.

An example of internal components of a system 118 in which transformations such as those described with respect to FIGS. 1 to 3 may be applied is shown schematically in FIG. 4. The system 118 of FIG. 4 includes a data processing system 120. The data processing system 120 includes an image capture device interface 122 to retrieve data from an image capture device 124. The image capture device interface 122 may include software and/or hardware components. Although the data processing system 120 of FIG. 4 is shown as separate from but coupled to an image capture device 124, in other examples the data processing system 120 and the image capture device 124 may be integrated in one device.

The data processing system 120 may receive input data from one image capture device 124. This may simplify the processing performed by the data processing system 120 by obviating the need to stitch together or combine multiple different images or frames obtained from multiple different image capture devices. In further examples, the data processing system 120 may receive data from a plurality of image capture devices. In such cases, the received data may be processed to generate input data representing an input frame, with the input frame representing an image obtained by stitching together a plurality of images captured using the plurality of image capture devices to create a continuous image, for example.

The image capture device 124 may be any suitable device for capturing images, such as a camera or a video camera. The image may be a still image, such as a frame of a video, or a moving image, such as a video. The image capture device 124 may be arranged to capture images over a wide field of view or angle, for example by including a wide-angle lens. For a 35 millimeter (mm) film format, wide-angle fisheye lenses may have a typical focal length of between 8 mm and 10 mm for circular images or between 15 mm and 16 mm for full-frame images, to give an angle of view of between 100 degrees and 180 degrees or even larger than 180 degrees, for example.

The data processing system 120 includes at least one storage 126. The at least one storage 126 of the data processing system 120 in the example of FIG. 4 stores the data received at the image capture device interface 122 and typically stores other data in addition. For example, the at least one storage 126 may store input data representing an input frame of a video (received at the image capture device interface 122), transformation data representing at least one transformation for applying to an image to adjust a geometric distortion of the image, first sub-window data representing a first sub-window of an output frame of the video and second sub-window data representing a second sub-window of the output frame of the video.

The at least one storage 126 may include at least one of volatile memory, such as a Random Access Memory (RAM), for example Static RAM (SRAM) or Dynamic RAM (DRAM) and non-volatile memory, such as Read Only Memory (ROM) or a solid state drive (SSD) such as Flash memory. The at least one storage 126 in examples may include further storage devices, for example magnetic, optical or tape media, compact disc (CD), digital versatile disc (DVD) or other data storage media. The at least one storage 126 may be removable or non-removable from the data processing system 120 or the image capture device 124 (where the data processing system 120 is integrated in the image capture device 124). Further details of the at least one storage 126 and the input data, transformation data, first sub-window data and second sub-window data are described further below with reference to FIG. 6.

At least one processor 128 is communicatively coupled to the at least one storage 126. The at least one processor 128 in the example of FIG. 4 may include a microprocessor, a general purpose processor, a digital signal processor (DSP), an application specific integrated circuit (ASIC), a field programmable gate array (FPGA) or other programmable logic device, a discrete gate or transistor logic, discrete hardware components, or any suitable combination thereof designed to perform the functions described herein. The processor may be or include a graphics processing unit (GPU). A processor may also be implemented as a combination of computing devices, e.g., a combination of a DSP and a microprocessor, a plurality of microprocessors, one or more microprocessors in conjunction with a DSP core, or any other such configuration.

The at least one storage 126 in the example of FIG. 4 may include computer program instructions configured to, when processed by the at least one processor 128, implement any of the methods described herein. The computer program instructions may be in any suitable format or language, for example in machine code, an assembly language or a register transfer language (RTL). For example, the at least one storage 126 may include instructions configured to, when processed by the at least one processor 128, implement a transformation engine 130 operable to receive the transformation data, process a first plurality of input tiles, each including a respective portion of the input frame, with at least part of the transformation data, thereby generating the first sub-window data and process a second plurality of input tiles, each including a respective portion of the input frame, with at least part of the transformation data, thereby generating the second sub-window data. The instructions may for example be included in a configuration bit stream for configuring the data processing system 20 to implement the methods described herein.

The computer program instructions may be stored in an accessible non-transitory computer-readable medium and loaded into memory, for example the at least one storage 126, to implement the transformation engine 130. In other examples, the transformation engine 130 may be implemented purely in hardware or in a combination of hardware and software.

The components of the data processing system 120 in the example of FIG. 4 are interconnected using a systems bus 132. This allows data to be transferred between the various components. For example, the first sub-window data and the second sub-window data generated by the transformation engine 130 can be stored in the at least one storage 126 and subsequently transmitted via the systems bus 132 from the at least one storage 126 to a display device interface 134 for transfer to a display device 136 for display. A suitable systems bus 132 is discussed further below with reference to FIG. 6.

The display device interface 134 may include a display port and/or an internal electronics interface, e.g. where the data processing system 120 and the display device 136 are part of the image capture device 124 such as a display screen of a security or monitoring system. Therefore, when instructed by the at least one processor 128 via the display device interface 134, the display device 136 may display the output frame. The output frame for example includes a first sub-window for displaying an image based on the first sub-window data and a second sub-window for display an image based on the second sub-window data.

Figure 5:
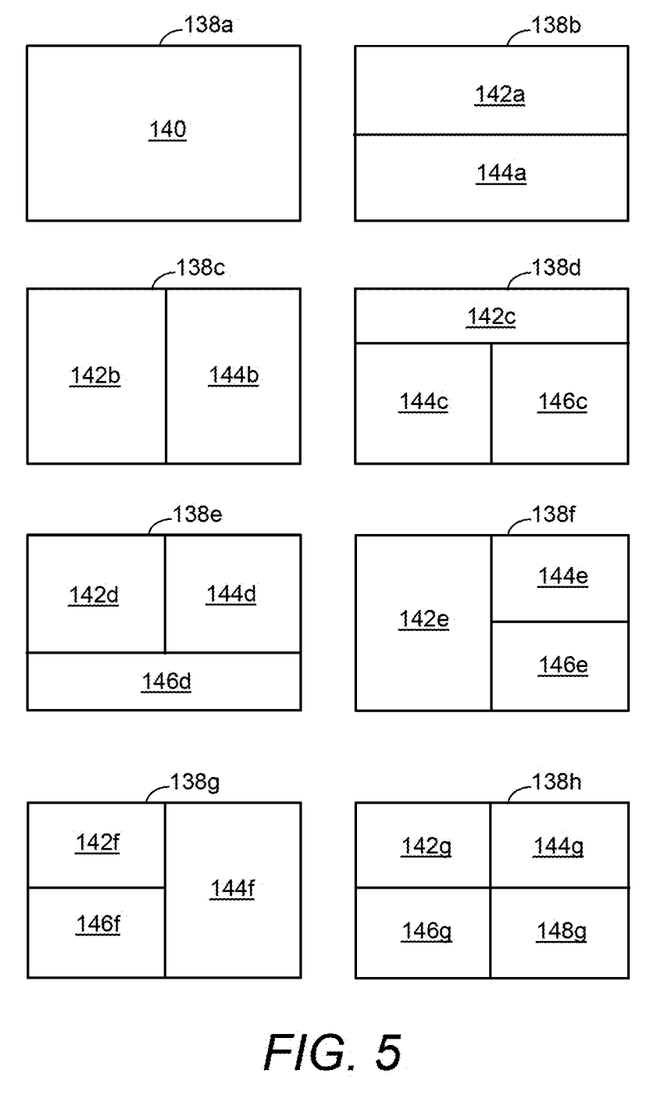
FIG. 5 is a schematic illustration of example electronic displays.

Example display devices 138a to 138h, sometimes referred to as electronic displays or display screens, are shown schematically in FIG. 5. The display devices 138a to 138h of FIG. 5 may be any display device for displaying an image, such as an electronic display of or coupled to a computing device or computing system. The display devices may be part of or coupled to a hand-held or portable device or to a system intended for use at a single or fixed location such as a desktop computer.

Each of the display devices 138a to 138h of FIG. 5 illustrate a different example of sub-windows that may be displayed on a respective display device. A sub-window is for example a portion or region of an output frame to be sent to a display device or display screen for displaying a piece of content, for example from a particular or predetermined source or origin, which may be different from content in other sub-windows of the output frame. For example, the first sub-window may correspond to a first area of an output frame and the second sub-window may correspond to a second area of the output frame. The first area may be non-overlapping with the second area, such that the first and second sub-windows are separate and distinct.

A sub-window typically corresponds to a fixed or time-invariant location of the output frames which are sent to a display screen. In other words, while the content of a particular sub-window may vary over time, the position of that sub-window may not change over time. However, in other examples, positions of sub-windows may alter over time. For example, a user may be able to choose to show or hide various sub-windows. By altering the number of sub-windows, the corresponding size of the displayed sub-windows may be adjusted to maximize the size of the content displayed. For example, if a user selects to display two sub-windows rather than three sub-windows, the size of the two displayed sub-windows may be increased to fill up the output frames sent to the display screen. It may also or alternatively be possible for a user to adjust the size of each or some individual sub-windows, for example by resizing the sub-windows using a mouse or by interacting directly with the display (if the display device is a touch-screen electronic display for example).

A first example display device 138a illustrated in FIG. 5 has one window 140. In this display device 138a, for example, a plurality of input tiles each including a respective portion of an input frame may be processed with transformation data to adjust a geometric distortion of the input tiles to generate an output frame. The output frame is displayed in the window 140. The transformation data may represent at least one transformation for adjusting a geometric distortion of an image and may be any such transformation. The first example display device 138a of FIG. 5 allows any transformation for adjusting a geometric distortion of an image, for example to correct a geometric distortion, to be applied to an input frame.

Further flexibility is provided with the second to eighth display devices 138b to 138h illustrated in FIG. 5.

The second example display device 138b of FIG. 5 has a first sub-window 142a and a second sub-window 144a. A first and a second plurality of input tiles, each input tile including a respective portion of an input frame, are processed with at least part of transformation data, to generate first and second sub-window data representing, respectively, a first and second sub-window of an output frame of the video. In other words, the first sub-window 142a displays an image based on the first sub-window data and the second sub-window 144a displays an image based on the second sub-window data. The output frame is formed of the first sub-window 142a, the second sub-window 144a. In other examples, the output frame may also include a border region that separates the first sub-window 142a and the second sub-window 144a. The border region may also surround one or both of the first and second sub-windows 142a, 144a, for example to separate one or both of the first and second sub-windows 142a, 144a from an edge of the second display device 138b.

The first plurality of input tiles processed to generate the first sub-window data may be the same as or different from the second plurality of input tiles that are processed to generate the second sub-window data. For example, the respective portions of the input frame corresponding to the first plurality of input tiles may together correspond to a first portion of the input frame and the respective portions of the input frame corresponding to the second plurality of input tiles may together correspond to a second portion of the input frame. In such cases, the first and/or second portions may each respectively be one continuous portion or region of the first frame, such as a block, section or segment.

The first portion may include the second portion. Where the first portion includes the second portion, at least part of the same image may be shown in both the first and second sub-windows 142a, 144a, with the same or a different transformation applied in each of the first and second sub-windows 142a, 144a. For example, the second portion may be at a different scale from the first portion. Thus, the second portion may be a zoomed in part of the first portion, or vice versa. In these examples, a first scale of the first sub-window may therefore may be different from a second scale of the second sub-window. For example, a different transformation can be applied in the first sub-window 142a compared with the second sub-window 144a to account for the different scale of these sub-windows with respect to each other. These transformations may be selected appropriately to reduce the geometric distortion visible in each sub-window, for example so that each sub-window does not appear distorted.

In other examples, though, the first and second portions may be at the same scale as each other. For example, the first and second portions may be the same as each other, and each may include the entirety of the input frame. In such cases, a different transformation may be applied to each sub-window, with each transformation being more effective at reducing distortion in a different part of an image. For example, as shown in FIGS. 1 to 3, a cylindrical transformation may be applied to accurately reduce distortion in a central image region, whereas a panoramic or a stereographic transformation may be more effective at reducing distortion in edge regions of an image than a cylindrical transformation.

In other examples, the first portion may be non-overlapping with the second portion. FIGS. 3b and 3c show an example in which the first portion is non-overlapping with the second portion. In FIGS. 3b and 3c, the first portion corresponds with the lower half of the input frame and the second portion corresponds with the upper half of the input frame. This typically allows different parts of the scene captured by the image capture device to be displayed at the same time, with the geometric distortion appropriately adjusted or reduced in each of the different sub-windows.

As noted above, the same or different transformations may be applied to generate each of the first and second sub-windows 142a, 144a. For example, the processing of the first plurality of input tiles may be to apply a transformation of a first type to the respective portions of the input frame corresponding to the first plurality of input tiles. In such examples, the processing of the second plurality of input tiles is to apply a transformation of either the first type or a second type, different from the first type, to the respective portions of the input frame corresponding to the second plurality of input tiles. In other words, the same transformation or a different transformation may be applied in each of the sub-windows 142, 144a. This provides further flexibility to the user of the data processing system. The at least one transformation may be any transformation for applying to an image to adjust, for example to correct or improve, a geometric distortion of the image and may be at least one of: a panoramic transformation, a cylindrical transformation, or a stereographic transformation.

In examples, the transformations applied in each of the sub-windows may be predetermined and may depend on the image capture device, for example on the field of view of the lens of the image capture device. For example, the distortion of an input frame captured with the image capture device may be determined and the transformations may be selected to reduce this distortion to a predetermined level. The transformations may also depend on the intended use of the output frame and a desired view for the user of the system. For example, the image capture device may be set up or positioned to capture a particular scene and it may be desired that the output frames display certain regions of the scene, or the scene at one or more scales.

In other examples, the user may be able to select the transformations to apply in each sub-window in real time, for example while using the system. For example, the user may be able to select between different transformations to apply in the different sub-windows, allowing the user to choose which view they prefer.

In the second example display device 138b of FIG. 5, the display device 138b is divided horizontally into the first and second sub-windows 142a, 144a. The third example display device 138c is similar to the second example display device 138b except that the first and second sub-windows 142b, 144b are side-by-side rather than one on top of the other. In other words, the third example display device 138c is divided vertically into the first and second sub-windows 142b, 144b.

The fourth, fifth, sixth and seventh example display devices 138d, 138e, 138f, 138g illustrate further examples in which there are first, second and third sub-windows. The first, second and third sub-windows are labelled with the reference numerals 142, 144 and 146 respectively, with the suffixes c, d, e and f indicating that the sub-window belongs to the fourth, fifth, sixth and seventh example display devices 138d, 138e, 138f, 138g, respectively. The eighth example display device 138h illustrates a further example in which there is a first, second, third and fourth sub-window 142g, 144g, 146g, 1468g. As illustrated in FIG. 5, the position and number of sub-windows is not limited; there may be any number of sub-windows in any position on the display device. Furthermore, the transformations applied in any of the sub-windows may be the same as or different from any of the other sub-windows.

An example of internal components of a transformation engine, such as the transformation engine 130 of FIG. 4, for applying the at least one transformation represented by the transformation data will now be described with reference to FIG. 6. The transformation engine of FIG. 6 can be used to transform a first and second plurality of input tiles of an input frame, for display in a first and second sub-window respectively. For example, the first plurality of input tiles may first be processed by the transformation engine as described with reference to FIG. 6 and subsequently the second plurality of input tiles may be processed by the transformation engine similarly. In other examples, though, the transformation engine of FIG. 6 may be used for transforming input tiles of an input frame for display in a single window of an output frame.

Figure 6:
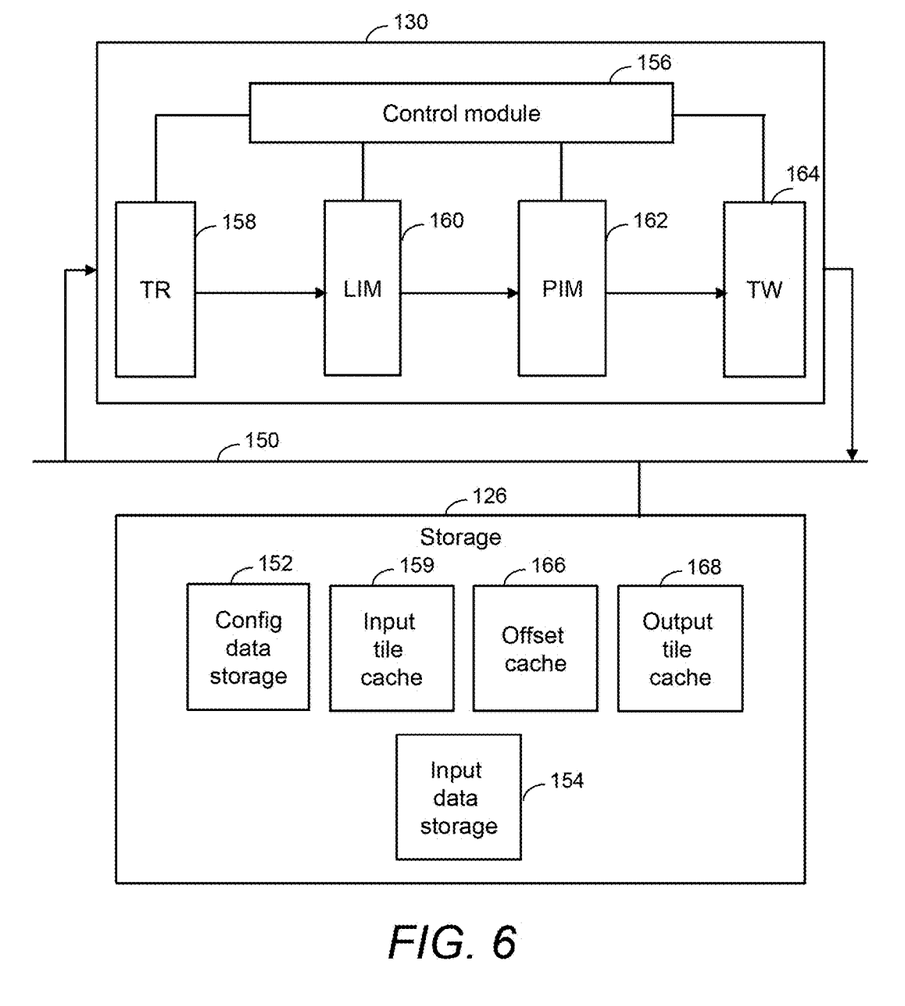
FIG. 6 is a schematic diagram showing an example of internal components of a transformation engine.

In the example of FIG. 6, the transformation engine 130 is integrated into a video pipeline, for receiving input data representing frames of the video. As described above, the video may be captured by one image capture device such as one video camera.

The transformation engine 130 in the example of FIG. 6 is part of a system-on-a-chip. For example, the system-on-a-chip may include the data processing system of FIG. 4, or components of the data processing system of FIG. 4. The transformation engine 130 may be interfaced with the video pipeline or with other hardware or software using an interface 150 or bus, which may be or include any suitable interface or bus. For example, an ARM® Advanced Microcontroller Bus Architecture (AMBA®) interface, such as the Advanced eXtensible Interface (AXI), may be used.

The transformation engine 130 in this example receives configuration data from a configuration data storage 152 and input data representing an input frame of a video from an input data storage 154. The configuration data storage 152 and the input data storage 154 are indicated as separate parts, for example separate caches, buffers or memories, of the at least one storage 126 in the example of FIG. 6. For example, the input data storage 154 may be a memory that is external to the transformation engine 130 and the configuration data storage 152 may be stored in a memory that is integral with the transformation engine 130. In other examples, the configuration data storage 152 and the input data storage 154 may be integrated in one storage.

Where the transformation engine 130 is integrated into the video pipeline via AXI, one or more AXI read masters may be used to read data for use by the transformation engine 130. In this example, the transformation engine 130 includes two AXI read masters (not shown). One of the AXI read masters is configured to read the configuration data from the configuration data storage 152, which may be in the form of a configuration bit stream and the other AXI read master is configured to read the input data representing the input frame from the input data storage 154. The two AXI read masters may be merged using an AXI arbiter and exported as a single AXI read master to simplify integration with the video pipeline. An AXI write master (not shown) may be used to write the first sub-window data and the second sub-window data into a specified location, for example for display using the display device.

The interface 150 may also include an APB (Advanced Peripheral Bus) interface for configuration of the registers of the transformation engine 130.

As described above, the input data storage 154 stores input data representing an input frame of a video. The video may be an encoded or a decoded video. For example, the video may be encoded using an encoding method such as H.264 or H.265 encoding and may be decoded prior to storage in the input data storage 154. Alternatively, the transformation engine 130 may include a decoder for decoding the video.

The video may include one or more colour channels. For example, the video may be monochrome, with pixels of a frame of the video varying from white to black via intermediate greyscale colours or intensities. Alternatively, the video may be a colour video, with multiple colour channels. Each colour channel may be stored on a separate plane (or array of intensity values), or multiple colour channels may share the same plane.

The video may for example be encoded using chroma subsampling, in which a lower resolution is used for chroma information (for example representing the colour of a frame) than for luma information (for example representing the brightness of the frame), in view of the lower sensitivity of the human visual system for colour differences compared to luminance differences. For example, the input data may be in the form of YUV 4:2:0 data (where Y represents the luma of the colour, U represents the difference between the blue component of the colour and the luma and V represents the difference between the red component of the colour and the luma). As the skilled person will appreciate, the 4:2:0 subsampling scheme indicates a horizontal sampling reference of 4, two chrominance samples in the first row of 4 rows (as the horizontal sampling reference is 4), and zero changes in chrominance samples between the first and second row of 4 pixels.

Where the data is YUV 4:2:0 data, a planar format sometimes referred to as YV12 may be used. In this format, the input data representing the input frame is separated into 3 planes, with Y, U and V planes each stored in a separate location (for example at a separate address) in memory. Another suitable format for YUV 4:2:0 data is the semi-planar NV12 format, in which the input data is separated into 2 planes. A first plane (corresponding to a first address in memory) stores the Y plane, and a second plane (corresponding to a second address in memory) stores the U and V plane. In the second plane, the data corresponding to the U values may be stored in the least significant bits (corresponding to low address values) and the data corresponding to the V values may be stored in the most significant bits (corresponding to higher address values).

Typically the resolution of the input frame is up to 4096 pixels by 2160 pixels, although higher resolutions may be possible. The resolution of each of the input and output frames is generally an even number in width. To improve the efficiency of the transformation engine, the image width may be selected to be a multiple of AXI words.

Referring back to FIG. 6, the method implemented by the transformation engine 130 in this example is controlled by the control module 156. The control module 156 receives a configuration bit stream from the configuration data storage 152. The configuration bit stream for example includes the transformation data representing the at least one transformation for applying to the input frame to adjust the geometric distortion of the input frame. Thus, by parsing the configuration bit stream, the control module 156 is instructed to control the modules of the transformation engine 130 to process a first and second plurality of input tiles with at least part of the transformation data to generate first and second sub-window data representing a first and second sub-window of an output frame.

The transformation data of the configuration bit stream in the example of FIG. 6 includes tile data indicating a location and/or size of a first and second plurality of input tiles of an input frame. The tile data may also indicate a location and/or size of a first and second plurality of output tiles of an output frame, the first and second plurality of output tiles corresponding respectively with the first and second plurality of input tiles. For example, the tile data may include tile descriptors indicating the coordinates or locations of input tiles and widths and heights of input tiles. The tile data may also include similar tile descriptors for the output tiles. The calculation of the tile data will be described further below with reference to FIGS. 7 and 8.

Based on the configuration bit stream, the control module 156 instructs a tile reader module 158 of the transformation engine 130 to read input data representing an input tile of the input frame. The input data in this example is read from the input data storage 154. The tile reader module 158 for example reads a part or sub-region of the input frame corresponding to an input tile, rather than the entirety of the input frame. The tile reader module 158 in this example then writes the input tile as input tile data to an input tile cache 159 for used by other components of the transformation engine 130. The input tile cache 159 may be integrated with the transformation engine 130 and may be configured to store one or more input tiles rather than a whole input frame, to reduce storage requirements. For example, the input tile cache 159 may be able to store data with a size of up to 32 kilobytes (kB). In this way, the input frame can be stored in the input data storage 154, externally to the transformation engine 130, with the integrated input tile cache 159 storing a smaller amount of data, corresponding to an input tile for example. This can improve the processing speed and reduce the storage requirements of the transformation engine 130. It is to be noted that references to a cache herein refer to any suitable memory or storage.

The input tile data may be read from the input tile cache 159 to a location interpolation module 160 in the example of FIG. 6. The location interpolation module 160 is operable to calculate, for an output tile of the output frame associated with an input tile of the input tile, using a functional mapping between respective output locations in the output frame and respective input locations in the input frame, an input location of the input locations corresponding with an output location of the output locations. The location interpolation module 160 can be used to determine the input locations that correspond to output locations that correspond to pixel locations in the output frame. An example derivation of the functional mapping used by the location interpolation module 160 is discussed in more detail with reference to FIGS. 7 and 8.

The output of the location interpolation module 160 is transferred to a pixel interpolation module 162 of the transformation engine 130, along with the input tile data representing the input tile. For each input location corresponding to respective output locations of the output tile, the pixel interpolation module 162 is used to identify a block of input locations that include the input location. Pixel data representing pixel values for input locations of the block of input locations is obtained (for example from the input tile data) and a pixel value for the input location is calculated based on the pixel data. The calculated pixel value is then associated with the output location. This process may be repeated for each output location of an output tile. For example, where each output location corresponds with a pixel of the output tile, the pixel values of the pixels of the output tile may therefore be calculated. An example calculation of the pixel values is described in detail with reference to FIG. 9.

The calculated pixel values may then be written to the at least one storage 126 (for example via an AXI write master) using a tile writer 164 of the transformation engine 130. It is typically not necessary to indicate the pixel output coordinates during the writing of the pixel values to the at least one storage 126 as the output pixels are typically written in raster order. In the example of FIG. 6, the at least one storage includes first storage for storing data relating to incomplete output tiles (labelled as an offset cache 166 in FIG. 6) and second storage for storing data relating to complete output tiles (labelled as an output cache 168 in FIG. 6). This allows the tile writer 164 to write data with a larger burst size than otherwise, for example with a maximum burst size for a particular output tile. For example, instead of writing data relating to incomplete output tiles in single transactions, the tile write 164 can send complete, or full, bursts to the output cache 168, relating to complete output tiles. This may reduce the number of interactions between the interface 150 (such as an AXI interface) and a memory management unit (MMU, not shown in FIG. 6), which may be used to translate virtual memory addresses to physical addresses.

Figure 7A:
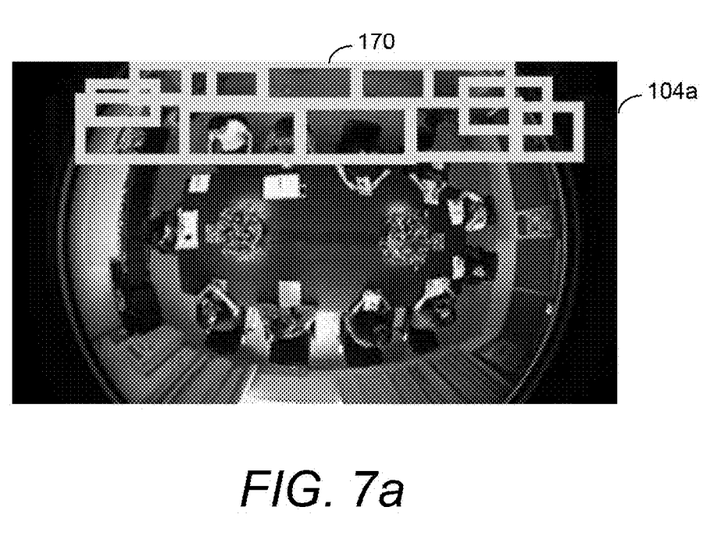
FIGS. 7a and 7b illustrate an example of a mapping between input tiles of an input frame and output tiles of an output frame.
Figure 7B:
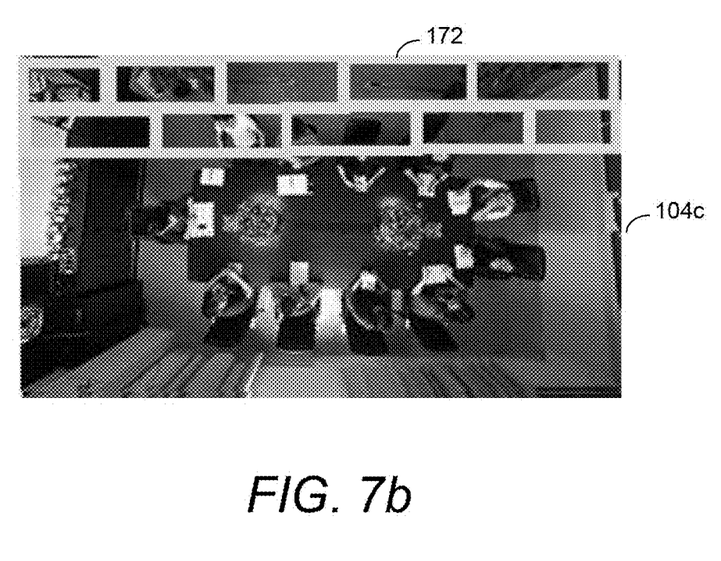

An example calculation of a functional mapping between positions of respective output locations of the output tile in the output frame and positions of respective input locations of the input tile in the input frame will now be described with reference to FIGS. 7 and 8. FIG. 7a illustrates an example of an input frame. The input frame in FIG. 7a is the same as the captured image 104a of FIG. 1b. FIG. 7b shows an example of an output frame, which in this case is the same as the transformed image 108a of FIG. 1c. The input frame 104a includes a plurality of input tiles 170 and the output frame 108a includes a plurality of output tiles 172. Each of the input tiles 170 corresponds with a respective output tile of the output tiles 172.

Figure 8A:
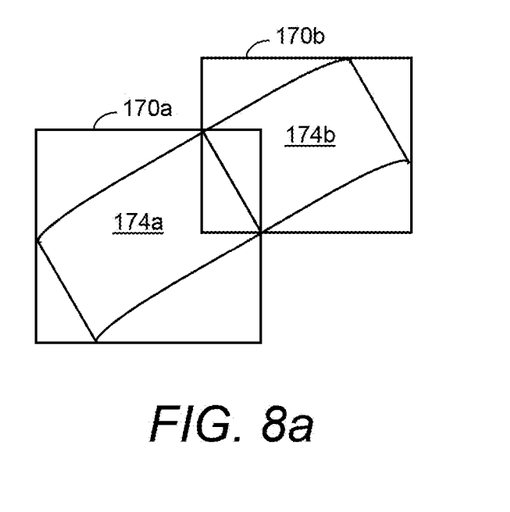
FIGS. 8a and 8b illustrate schematically a mapping between input tiles of the input frame and output tiles of the output frame of FIGS. 7a and 7b.
Figure 8B:
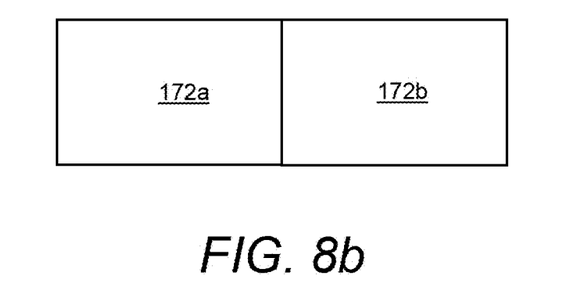

In the example of FIGS. 7a and 7b, due to the curvature of the image represented in the input frame 104a, some of the input tiles overlap other input tiles. This is shown further in FIGS. 8a and 8b. FIG. 8a illustrates schematically two input tiles 170a, 170b of the plurality of input tiles 170 shown in FIG. 7a and FIG. 8b shows schematically two output tiles 172a, 172b of the plurality of output tiles 172 shown in FIG. 7b. Each of the input tiles 170a, 170b includes a respective portion 174a, 174b of the input frame. In this example, due to the curvature of the input frame 104a because of the wide-angle lens used for capturing the input frame 104a, the portions 174a, 174b of the input frame, which correspond to the respective output tiles 172a, 172b respectively, are also curved. However, the input tiles 170a, 170b in this example correspond to blocks of input pixels, which are rectangular in shape, rather than the curved set of pixels of the portions 174a, 174b. This is because the input frame in examples is read into memory or storage in a line-by-line manner. It is therefore more straightforward to save rectangular input tiles rather than the portions themselves, which may be irregularly shaped. For example, in some cases an input tile including a portion of the input frame is rectangular, the output tile is rectangular and the portion of the input frame is non-rectangular. In these examples, at least some of the output locations in the output frame may correspond with a boundary of an output tile and at least some of the input locations in the input frame may correspond with a boundary of a portion of the input frame, rather than a boundary of an input tile.

The tile widths of the plurality of input tiles 170 and the plurality of output tiles 172 in this example are based on the tile data. The tile data may have been derived by determining a tile width of an input tile of at least one of the first plurality of input tiles or the second plurality of input tiles based on a size of storage for storing the input tile. For example, there is typically a hardware limitation to the size of an output tile, which may be related to the size of the storage for storing incomplete tiles. For example, the offset cache 166 of FIG. 6 may be able to store up to 128 lines of the output frame, corresponding to up to 128 incomplete words. Similarly, the storage for storing input tiles, which is for example illustrated as the input tile cache 159 in FIG. 6, may have a certain data capacity. The size of the input tiles can therefore be adjusted so that each of the input tiles will be of a size that can be fitted in the input tile cache 159. For example, as an initial iteration, the output tiles can be taken to be the width of the input frame and the height corresponding to the maximum number of lines that can be stored in the offset cache 166. Then, the corresponding input tile can be calculated using the function representing the transformation, or using the functional mapping. The size of this input tile can be compared with the size of the storage for storing the input tile. If the input tile is too large, the process can be repeated again but with the width of the output tile bisected. This process can be repeated incrementally until the input tile fits in the input tile cache 159. Then, the width of the input and output tiles can be saved as part of the tile data and re-used for subsequent images. In other words, the same widths can be used for the input tiles and the output tiles of subsequent frames of a video, without having to recalculate the widths each time (although the width of the input tiles may differ from the width of the output tiles).

In examples, the functional mapping used by the location interpolation module 160 of FIG. 6 may be derived from an interpolation based on the respective output locations in the output frame and a function representing a transformation of the at least one transformation. For example, the function may represent a geometric mapping of output locations of the output frame to corresponding input locations of the input frame. The function may be a continuous function that represents a predetermined or desired correction or adjustment to be applied to the input frame to correct or adjust the geometric distortion of the input frame. Alternatively, the function may be discontinuous or empirical.

Various different interpolation methods may be used to derive the functional mapping. In examples, the interpolation is a spline interpolation. In such examples, the output locations may correspond to respective knots of the spline. For example, where the output locations correspond to integer pixel locations, the knots of the spline may also coincide or correspond to integer pixel locations. The knots of the spline may be uniformly spaced in the coordinate system of the output frame, although non-uniform inter-knot spacing is possible in some examples. Using a spline interpolation with integer knot locations for example forces a mapping to be found from input locations to integer output locations (corresponding to the knots of the spline), improving the accuracy of the functional mapping. In contrast, with the function representing the mapping, it may not be possible to precisely map the input locations to integer output locations for at least some of the output locations (corresponding to output pixels). This may therefore lead to rounding errors that may be avoided when using the spline interpolation with integer knots.

An interpolation may be performed separately for each dimension of the input frame. For example, if the input frame is in a two-dimensional coordinate system, with a horizontal x coordinate and a vertical y coordinate, an interpolation may be performed in the x-direction for a row of pixels of the input tile (which for example corresponds with a fixed or constant y location) and subsequently an interpolation may be performed in the y-direction for a column of pixels of the input tile.

The spline interpolation may be a second order spline interpolation. Such an interpolation may be used to determine the spline coefficients for a sum of spline functions, such as a sum of spline basis functions, including a second order basis function. For example, the spline interpolation may be based on an adjustment of spline coefficients of the spline in dependence on an error between the spline and the function representing the transformation of the at least one transformation. For example, the spline coefficients may be incrementally altered to minimize an error between the spline function and the function representing the transformation. The error is for example a difference between the spline function and the function representing the transfor-mation. As the skilled person will appreciate, the error minimization may use any suitable method, such as gradient descent.

In normalized coordinates, where spline knots are at integer positions in the output frame (in other words, where spline knots coincide with pixel locations in the output frame), a one-dimensional spline may be taken to correspond with a weighted sum of the following hat functions shifted by integer numbers in the coordinate system of the output frame (although other functions are possible in other examples):

$$y = \frac{t^2}{2}, 0 \le t \le 1$$

$$y = -\frac{3}{2} + 3t - t^2, 1 \le t \le 2$$

$$y = \frac{(3-t)^2}{2}, 2 \le t \le 3$$

$$y = 0, t < 0, t > 3$$

A two dimensional b-spline (basis-spline) may be taken to be a product of the above functions in the horizontal and vertical directions.

For interpolation of a one dimensional b-spline, on each interval the resultant function will be a second order polynomial, which can be calculated using an incremental scheme. For example, the first derivative is interpolated as a linear ramp and the function can be taken as the cumulative sum of the first derivative samples. For such an interpolation, the result will depend on three control points because the basis functions have limited support. The slope of the first derivative will be the linear combination of these three points.

These calculations can be done using integer arithmetic without a loss of precision. This allows the same result, in other words the same corresponding input location in the input tile, to be achieved for an output location at the right edge of one output tile and the left edge of the neighbouring tile to the left. For example, a rounding error may not be accumulated.

In some cases, knot coefficients may be negative to correspond to input locations that are beyond the extent of an input image capture device, or a sensor of such an image capture device. If, for example, the storage for storing the input locations calculated using the functional mapping is capable of storing 16-bit values, the (x, y) offsets can be added to the calculated (x, y) values so that the knot values fit an unsigned 16-bit integer. The (x, y) offsets are subtracted at the end of the calculations and the result can be stored as an unsigned 16-bit number. The 16-bit (x, y) values in such cases therefore correspond to input locations in the input frame with sub-pixel accuracy, for example with the three least significant bits representing the fractional part of the (x, y) values.

Where the input data is in the YUV 4:2:0 format, the same knot coefficients can be used. However, the knot step or the spacing between neighbouring knots may be selected to be half the nominal value to account for downsampling by a factor of two of the U, V components of the YUV data. The spline sampling grid may also be shifted by a quarter for the Y component.

The interpolation procedure typically allows coefficients of the spline function to be obtained. These coefficients can be stored as the configuration data in the configuration data storage 152, for use by the location interpolation module 160 to calculate the input location corresponding to an output location of an output tile associated with a particular input tile.

The location interpolation module 160 may include two modules (not shown in FIG. 6). For example, the location interpolation module may include a first module to fetch the appropriate coefficients for a particular input tile from the configuration data storage 152. The first module may for example determine a location or address at which the appropriate coefficients are to be fetched from in the configuration data storage 152, as the configuration data storage 152 may store a plurality of different sets of coefficients, with each set corresponding to a different input tile or a different location of an input tile.

The first module may also calculate an initial interpolation value and send the calculated initial interpolation value to a second module of the location interpolation module 160. The first module may subsequently also, during the interpolation process, send derivatives of base functions over various regions to the second module. The second module may then accumulate or sum the derivatives to calculate the input location corresponding to the output location of the output tile (as the spline function may be a cumulative sum of first derivative samples).

Furthermore, the first or second module or a further module of the location interpolation module 160 may be used to calculate a scale factor representing a difference in scale between the output tile including the output location and the input tile including the input location or a per-pixel difference in scale between output pixels and corresponding input pixels, which may be sent to the pixel interpolation module 162 as described further below. The scale factor may be recalculated upon or in response to a change in a position, such as a change in the pan, tilt or zoom, of the image capture device.

Figure 9:
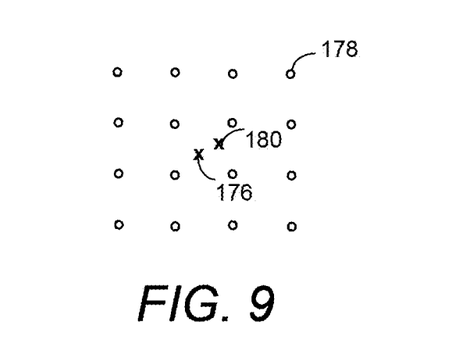
FIG. 9 illustrates schematically the calculation of a pixel value for a location in an output frame.

After obtaining the input location for an output location of the output tile, the corresponding pixel value for that input location can be derived. In examples, the pixel value for the input location is based on an interpolation based on the pixel data. FIG. 9 shows such an example.

In FIG. 9, for an input location 176 calculated using a spline interpolation as described above, for example, a block or grid of input locations 178 including the input location 176 is identified. The block of input locations 178 can for example be obtained using the integer part of the coordinates of the input location 176. The block of input locations 178 may be any size. Typically, for bicubic interpolation (discussed below), the block of input locations 178 is four pixels by four pixels.

Pixel data representing pixel values for input locations of the block of input locations 178 is obtained, for example from the input tile cache 159. The pixel data may be for a subset of the input locations of the block of input locations rather than for each input location. For example, the pixel data stored in the input tile cache 159 may include data representing pixel values of a subset of the pixels of the input tile, to reduce storage and processing requirements. For example, if the input frame includes 2 million input locations (or pixels), pixel data may be stored for 1000 input locations of the 2 million input locations. Similarly, the input tile cache 159 may store pixel data for a subset of the pixels of the input tile rather than for all of the pixels of the input tile.

Using the pixel data, an interpolation can be performed to calculate a pixel value for the input location 176. The pixel value for the input location 176 is then associated with the output location in the output frame.

The interpolation is for example a bicubic interpolation. For example, the interpolation may use at least one polyphase filter, for example a bank of polyphase filters. The at least one polyphase filter may depend on at least one of: the input location or the input tile including the input location. For example, the coefficients of the at least one polyphase filter may differ depending on the input location or the input tile of the input location. For example, each column of the block of input locations 178 may be filtered with a four tap polyphase filter, with tap coefficients that depend on the fractional part of the y-coordinate of the input location 176. The results may then be filtered using a four tap polyphase filter with tap coefficients that depend on the x-coordinate of the input location 176.

For example, the at least one polyphase filter may depend on a scale factor representing a difference in scale between the output tile including the output location and the input tile including the input location. For example, due to the geometric distortion of the input tile, the input tile may be compressed compared with the output tile. The input tile may therefore be downscaled compared with the output tile. A local scale factor can be calculated for the input tile, for example based on the derivatives of the functional mapping, and the coefficients of the at least one polyphase filter may then depend on the calculated scale factor. A different set of coefficients may be determined for each input tile, for example using a different local scale factor. In other examples, though, the coefficients may differ for each individual pixel of an input tile, based on a scale factor calculated on a per-pixel basis for example.

In some examples, there may be two input locations that lie within the same block of input locations. FIG. 9 shows such an example. In FIG. 9, the input location is a first input location 176, the output location is a second output location and the pixel value is a first pixel value. In FIG. 9, the method also includes obtaining a second input location 180 corresponding with a second output location. For example, the second input location 180 may be calculated using the functional mapping described above. In the example of FIG. 9, a second pixel value is calculated for the second location 180 based on the pixel data and the second pixel value is associated with the second output location in the output frame. In this way, it is not necessary to re-obtain or re-read the pixel data corresponding to the block of input locations 178. Instead, the pixel data can be re-used for both input locations 176, 180 and a similar process can be used to obtain the pixel values for each. For example, the same polyphase filters may be used for each, but with different coefficients. Alternatively, different polyphase filters may be used for each. For example, the polyphase filter or polyphase filters to be used may be selected based on the scale factor described above, for example to reduce or prevent aliasing. The fractional coordinate associated with the input locations 176, 180 may determine which phase to use for the polyphase filter(s). For example, if the scale factor is calculated separately for each input tile, the scale factor for the input locations 176, 180 will be the same (as the input locations 176, 180 are both within the same input tile). However, in the example of FIG. 9, the fractional coordinate is different for the input locations 176, 80. Thus, in this example, the same polyphase filter may be used for the interpolation of the pixel value for each of the input locations 176, 180 but with different phases. Conversely, for different colour channels of the same input location, the same polyphase filter and phase may be used to interpolate the pixel value for that colour channel. However, as the intensity values associated with each colour channel typically differ from those of each other colour channel, the calculated pixel value for that colour channel will also differ from the calculated pixel value for other colour channels for that input location.

Typically, the derivation of coefficients for the interpolations implemented by the location interpolation module 160 and the pixel interpolation module 162 of FIG. 6 (described with reference to FIGS. 7 to 9) may be performed prior to receiving video data, for example using suitable software, as the geometric distortion for example depends on the lens of the image capture device, which may not change between different frames of a video. For example, the coefficients may be obtained using test data and supplied to the data processing system as part of the configuration system. In other examples, though, the data processing system may be used to apply the at least one transformation to the input data and to derive the coefficients for use in the interpolations described above. For example, the transformation data may be time-varying, for example in dependence on a time-varying change in position of the image capture device. For example, it may be possible to alter a pan, tilt or zoom of the image capture device, to capture a different scene. In such cases, it may be desirable to recalculate the coefficients of the interpolations using the data processing system.

The above examples are to be understood as illustrative examples. Further examples are envisaged. For example, although the interpolations are described in the context of the methods of processing image data described herein, it will be appreciated that either or both of the location interpolation or the pixel value interpolation may be performed as part of other methods of processing image data, for example representing a frame of a video.

It is to be understood that any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the accompanying claims.

Further examples are described below. In a first set of embodiments, a method includes: receiving input data representing an input frame of a video; receiving transformation data representing at least one transformation for applying to an image to adjust a geometric distortion of the image; processing a first plurality of input tiles, each comprising a respective portion of the input frame, with at least part of the transformation data, thereby generating first sub-window data representing a first sub-window of an output frame of the video; and processing a second plurality of input tiles, each comprising a respective portion of the input frame, with at least part of the transformation data, thereby generating second sub-window data representing a second sub-window of the output frame of the video.

In some embodiments, the method includes receiving the input data from one image capture device. In some embodiments, the method includes receiving a configuration bit stream, the configuration bit stream comprising the transformation data. In some embodiments, the at least one transformation is at least one of: a panoramic transformation, a cylindrical transformation, or a stereographic transformation. In some embodiments, the processing the first plurality of input tiles is to apply a transformation of a first type to the respective portions of the input frame corresponding to the first plurality of input tiles; and the processing the second plurality of input tiles is to apply the transformation of the first type to the respective portions of the input frame corresponding to the second plurality of input tiles. In some embodiments, the processing the first plurality of input tiles is to apply a transformation of a first type to the respective portions of the input frame corresponding to the first plurality of input tiles; and the processing the second plurality of input tiles is to apply a transformation of a second type, different from the first type, to the respective portions of the input frame corresponding to the second plurality of input tiles. In some embodiments, the respective portions of the input frame corresponding to the first plurality of input tiles together correspond to a first portion of the input frame; the respective portions of the input frame corresponding to the second plurality of input tiles together correspond to a second portion of the input frame; and the first portion includes the second portion. In some embodiments, the respective portions of the input frame corresponding to the first plurality of input tiles together correspond to a first portion of the input frame; the respective portions of the input frame corresponding to the second plurality of input tiles together correspond to a second portion of the input frame; and the first portion is non-overlapping with the second portion. In some embodiments, a first scale of the first sub-window is different from a second scale of the second sub-window. In some embodiments, the transformation data is time-varying. In some embodiments, the transformation data is time-varying in dependence on a time-varying change in position of the image capture device. In some embodiments, the first sub-window corresponds to a first area of the output frame and the second sub-window corresponds to a second area of the output frame, the first area non-overlapping the second area.

In some embodiments, the method includes determining a tile width of an input tile of at least one of: the first plurality of input tiles or the second plurality of input tiles based on a size of storage for storing the input tile. In some embodiments, the method includes, for an output tile of the output frame associated with an input tile of the input frame: calculating, using a functional mapping between positions of respective output locations of the output tile in the output frame and positions of respective input locations of the input tile in the input frame, an input location of the input locations corresponding with an output location of the output locations. In some embodiments, the output locations correspond to pixel locations in the output frame. In some embodiments, at least some of the input locations correspond to locations between pixel locations in the input frame. In some embodiments, at least some of the output locations in the output frame correspond with a boundary of an output tile of the plurality of output tiles and at least some of the input locations in the input frame correspond with a boundary of a portion of the input frame. In some embodiments, an input tile comprising the portion of the input frame is rectangular, the output tile is rectangular and the portion of the input frame is non-rectangular. In some embodiments, the functional mapping is derived from an interpolation based on: the respective output locations in the output frame; and a function representing a transformation of the at least one transformation. In some embodiments, the interpolation is a spline interpolation, the output locations corresponding to respective knots of a spline for the spline interpolation. In some embodiments, the knots of the spline are uniformly spaced. In some embodiments, the spline interpolation is a second order spline interpolation. In some embodiments, the spline interpolation is based on an adjustment of spline coefficients of the spline in dependence on an error between the spline and the function representing the transformation of the at least one transformation.

In some embodiments, the method includes identifying a block of input locations comprising the input location; obtaining pixel data representing pixel values for input locations of the block of input locations; calculating a pixel value for the input location based on the pixel data; and associating the pixel value with the output location. In some embodiments, the calculating the pixel value for the input location is based on an interpolation based on the pixel data. In some embodiments, the interpolation uses at least one polyphase filter. In some embodiments, the at least one polyphase filter depends on at least one of: the input location or the input tile comprising the input location. In some embodiments, the at least one polyphase filter depends on a scale factor representing a difference in scale between the output tile comprising the output location and the input tile. In some embodiments, the input location is a first input location, the output location is a second output location and the pixel value is a first pixel value, and the method further includes: calculating, using the functional mapping, a second input location of the input locations corresponding with a second output location of the output locations, the block of input locations comprising the second input location; calculating a second pixel value for the second location based on the pixel data; and associating the second pixel value with the second output location.

In a second set of embodiments, a data processing system includes: at least one storage for storing: input data representing an input frame of a video; transformation data representing at least one transformation for applying to an image to adjust a geometric distortion of the image; first sub-window data representing a first sub-window of an output frame of the video; and second sub-window data representing a second sub-window of the output frame of the video; at least one processor communicatively coupled to the storage; a transformation engine operable to: receive the transformation data; process a first plurality of input tiles, each comprising a respective portion of the input frame, with at least part of the transformation data, thereby generating the first sub-window data; and process a second plurality of input tiles, each comprising a respective portion of the input frame, with at least part of the transformation data, thereby generating the second sub-window data.

In some embodiments, the data processing system is a system-on-a-chip. In some embodiments, the data processing system includes a control module operable to receive a configuration bit stream, the configuration bit stream comprising the transformation data. In some embodiments, the transformation engine includes a location interpolation module operable to, for an output tile of the output frame associated with an input tile of the input frame: calculate, using a functional mapping between positions of respective output locations of the output tile in the output frame and positions of respective input locations of the input tile in the input frame, an input location of the input locations corresponding with an output location of the output locations. In some embodiments, the transformation engine includes a pixel interpolation module operable to: identify a block of input locations comprising the input location; obtain pixel data representing pixel values for input locations of the block of input locations; calculate a pixel value for the input location based on the pixel data; and associate the pixel value with the output location. In some embodiments, the at least one storage includes: first storage for storing data relating to incomplete output tiles; and second storage for storing data relating to complete output tiles.

The invention claimed is:

1. A method comprising:
  receiving input data representing an input frame of a video;
  receiving transformation data representing at least one transformation for applying to an image to adjust a geometric distortion of the image;
  determining a tile width of an input tile of at least one of:
    a first plurality of input tiles, each comprising a respective portion of the input frame; or
    a second plurality of input tiles, each comprising a respective portion of the input frame,
    based on a size of storage for storing the input tile;
  processing the first plurality of input tiles with at least part of the transformation data, thereby generating first sub-window data representing a first sub-window of an output frame of the video; and
  processing the second plurality of input tiles with at least part of the transformation data, thereby generating second sub-window data representing a second sub-window of the output frame of the video.

2. The method of claim 1, comprising receiving the input data from one image capture device.

3. The method of claim 1, comprising receiving a configuration bit stream, the configuration bit stream comprising the transformation data.

4. The method of claim 1, wherein:
  the processing the first plurality of input tiles is to apply a transformation of a first type to the respective portions of the input frame corresponding to the first plurality of input tiles; and
  the processing the second plurality of input tiles is to apply a transformation of a second type, different from the first type, to the respective portions of the input frame corresponding to the second plurality of input tiles.

5. The method of claim 1, wherein:
  the respective portions of the input frame corresponding to the first plurality of input tiles together correspond to a first portion of the input frame;
  the respective portions of the input frame corresponding to the second plurality of input tiles together correspond to a second portion of the input frame; and
  the first portion is non-overlapping with the second portion.

6. The method of claim 1, comprising, for an output tile of the output frame associated with an input tile of the input frame:
  calculating, using a functional mapping between positions of respective output locations of the output tile in the output frame and positions of respective input locations of the input tile in the input frame, an input location of the input locations corresponding with an output location of the output locations.

7. The method of claim 6, wherein the output locations correspond to pixel locations in the output frame.

8. The method of claim 6, wherein at least some of the input locations correspond to locations between pixel locations in the input frame.

9. The method of claim 6, wherein at least some of the output locations in the output frame correspond with a boundary of the output tile and at least some of the input locations in the input frame correspond with a boundary of a portion of the input frame.

10. The method of claim 6, wherein the functional mapping is derived from an interpolation based on:
  the respective output locations in the output frame; and a function representing a transformation of the at least one transformation.

11. The method of claim 10, wherein the interpolation is a spline interpolation, the output locations corresponding to respective knots of a spline for the spline interpolation.

12. The method of claim 11, wherein the knots of the spline are uniformly spaced.

13. The method of claim 6, comprising:
identifying a block of input locations comprising the input location;
obtaining pixel data representing pixel values for input locations of the block of input locations;
calculating a pixel value for the input location based on the pixel data; and
associating the pixel value with the output location.

14. The method of claim 13, wherein the calculating the pixel value for the input location is based on an interpolation based on the pixel data.

15. The method of claim 14, wherein the interpolation uses at least one polyphase filter depending on at least one of: the input location or the input tile comprising the input location.

16. The method of claim 14, wherein the interpolation uses at least one polyphase filter depending on a scale factor representing a difference in scale between the output tile comprising the output location and the input tile.

17. The method of claim 13, wherein the input location is a first input location, the output location is a second output location and the pixel value is a first pixel value, the method comprising:
calculating, using the functional mapping, a second input location of the input locations corresponding with a second output location of the output locations, the block of input locations comprising the second input location;
calculating a second pixel value for the second location based on the pixel data; and
associating the second pixel value with the second output location.

18. A data processing system comprising:
at least one storage for storing:
input data representing an input frame of a video;
transformation data representing at least one transformation for applying to an image to adjust a geometric distortion of the image;
first sub-window data representing a first sub-window of an output frame of the video; and
second sub-window data representing a second sub-window of the output frame of the video;
at least one processor communicatively coupled to the at least one storage;
a transformation engine operable to:
receive the transformation data;
process a first plurality of input tiles, each comprising a respective portion of the input frame, with at least part of the transformation data, thereby generating the first sub-window data; and
process a second plurality of input tiles, each comprising a respective portion of the input frame, with at least part of the transformation data, thereby generating the second sub-window data,
wherein a tile width of an input tile of at least one of the first plurality of input tiles or the second plurality of input tiles is based on a size of a portion of the at least one storage for storing the input tile.

19. The data processing system of claim 18, wherein the at least one storage comprises:
first storage for storing data relating to incomplete output tiles; and
second storage for storing data relating to complete output tiles.

20. The data processing system of claim 18, wherein the transformation engine is operable to:
process the first plurality of input tiles to apply a transformation of a first type to the respective portions of the input frame corresponding to the first plurality of input tiles; and
process the second plurality of input tiles is to apply a transformation of a second type, different from the first type, to the respective portions of the input frame corresponding to the second plurality of input tiles.

* * * * *